United States Patent [19]

Akin et al.

[11] 4,252,836

[45] Feb. 24, 1981

[54] SPREADABLE FOOD PRODUCT

[75] Inventors: Cavit Akin; Rose M. Murphy, both of Naperville, Ill.

[73] Assignee: Standard Oil Company (Indiana), Chicago, Ill.

[21] Appl. No.: 96,790

[22] Filed: Nov. 23, 1979

[51] Int. Cl.³ ............................................... A23D 5/00
[52] U.S. Cl. ...................................... 426/602; 426/60; 426/62
[58] Field of Search ................. 426/602, 603, 604, 60, 426/62

[56] References Cited

U.S. PATENT DOCUMENTS

| | | | |
|---|---|---|---|
| 3,437,494 | 4/1969 | Loter et al. | 426/602 |
| 3,961,080 | 6/1976 | Sugimoto et al. | 426/60 |
| 3,975,553 | 8/1976 | Griffon | 426/60 |
| 3,995,066 | 11/1976 | Muys et al. | 426/603 X |
| 3,997,397 | 12/1976 | Craveri et al. | 426/60 X |
| 4,122,196 | 10/1978 | Robbins et al. | 426/656 X |
| 4,160,039 | 7/1979 | Schnell | 426/60 |

*Primary Examiner*—Robert A. Yoncoskie
*Attorney, Agent, or Firm*—Gregory E. Croft; William T. McClain; William H. Magidson

[57] ABSTRACT

A spreadable food product having a lower calorie content than conventional spreadable food products is prepared by mixing 10–20 weight percent autolyzed yeast cell residue with vegetable oil and an aqueous component wherein the volumetric ratio of the vegetable oil to the aqueous component is from about 40/60 to about 60/40.

11 Claims, No Drawings

SPREADABLE FOOD PRODUCT

Consumers today have become more and more aware of the calorie content of foods they eat. Because most people have a weight problem to some extent, there is an incentive for each individual to minimize his or her calorie intake. Spreadable food products are commonly found in the average person's daily diet and their calorie content is relatively high. For example, the following are spreadable food products with their calorie content expressed as calories per 100 grams: butter (716), margarine (720), mayonnaise (718), peanut butter (581), peanut spread (601), Italian salad dressing (552), oils (884). There is a need for a spreadable food product having a much lower calorie content.

It has now been discovered that the indigestible cell residue obtained from the autolysis of yeast can be used as a primary ingredient for making a spreadable food product having a lower calorie content.

Autolysis and the production of the cell residue is well known in the art. Generally speaking, the autolysis process involves incubating an aqueous slurry of yeast cells at temperatures of about 40°–60° C. for an extended period of time, such as 12–24 hours or more depending upon the desired results. During this time the active enzymes within the system break down and solubilize the cell components, leaving behind an undigestible cell residue which can be recovered by centrifugation and drying. Because this cell residue does not appear to have any thickening ability in aqueous systems, others in the art have found methods of further treating the cell residue to enhance its properties. See for example, U.S. Pat. No. 4,122,196 to Robbins et al. wherein the residue is comminuted and subjected to an alkaline extraction to produce what has been termed yeast glycan.

However, until this discovery, there has not been found a method of using the untreated cell residue to favorably alter the physical properties of food systems.

SUMMARY OF THE INVENTION

It has now been found that a spreadable, pasteurizable, and retortable food product can be prepared by combining proper amounts of an aqueous component, vegetable oil, and the cell residue from autolysis. In particular, the residue must be present at a level of from about 10 to about 20 weight percent based on the total weight of the three mentioned components. A level of about 15 weight percent is preferred. The remainder of the product (80–90 weight percent) contains an aqueous component and vegetable oil, which can be present in volume ratios ranging from about 40/60 to about 60/40. A 50/50 ratio is preferred. Other minor ingredients such as flavorings, colorants, preservatives, etc., can also be present. The aqueous component can be essentially all water, or it can contain other soluble or miscible components such as acetic acid. The vegetable oil can be any suitable edible vegetable oil, including, for example, corn, cottonseed, olive, peanut, safflower, sesame, soybean, etc. Any autolyzable yeast can be used to prepare the products described herein, but baker's yeast (Saccharomyces cerevisiae) is preferred because of its widespread use and acceptance as a food ingredient.

The resulting product has a markedly increased viscosity above what would be expected from such a combination. The emulsifying effect exhibited by the cell residue is particularly surprising since the whole yeast cell itself does not have such an effect. The relative proportions of the three primary components are critical.

EXPERIMENTAL

A sample of autolysis cell residue was prepared by dissolving 550 g. of salt in 10 liters of tap water at room temperature. Compressed baker's yeast (10 Kg.) was added to the salt solution while applying mild mixing. The yeast dispersed almost immediately to form an easy flowing slurry. Dextrose (100 g.) was then added, which caused carbon dioxide generation almost immediately. Ethanol (200 ml.) and thiamine (20 g.) were then added to the slurry. The mixture was held at room temperature for 30 minutes (the temperature should not exceed 32° C.) and thereafter gradually heated to 50°–55° C. over a period of 40 minutes. The slurry was maintained at this incubation temperature range for about 4 hours. (The incubation temperature should not exceed 58° C. at any time to prevent deactivation of the enzymes.)

Upon completion of the autolysis, the autolyzed slurry contained essentially two products. One was the insoluble cell residue and the other was the solubilized cell contents. These two products were physically separated by centrifugation. The residue was recovered and resuspended in water as a 10% slurry and spray-dried to a powder. The powder so obtained had the following approximate composition:

| | |
|---|---|
| Ash | 0.4–1.5% |
| Water Solubles | 2.2–2.4% |
| N × 6.25 | 16–29% |
| Biuret Protein | 13.2–30% |
| RNA | 1.9–2.9% |
| Moisture | 4.2–5.2% |

Other yeast autolysis residues can also be prepared in a similar manner and will also be suitable for use in preparing spreadable food products as taught below.

Spreadable food products were prepared by mixing the residue with various oil/water or oil/vinegar (4–8 weight percent acetic acid) mixtures in a kitchen mixer or by passing through a homogenizer. The range of conditions are set forth in TABLE I below.

TABLE I

| | Suitable Range | Preferred Range |
|---|---|---|
| Oil/water ratio | 40/60 to 60/40 | 45/55 to 55/45 |
| Residue % | 10–20% | 13–16% |
| Mixing Temp. | 10–40° C. | 20–30° C. |
| Mixing Procedure | Kitchen Mixer or Salad Dressing Homogenizer 1–4 passes | Homogenizer 2–3 passes |
| Pasteurization Temperature | 55–85° C. | 60–70° C. |
| Pasteurization Time | 10–60 mins. | 15–25 mins. |
| Retort Temp. | 121° C. | 121° C. |
| Retort Time | Depends on container size | Depends on container size |

The viscosity of the emulsion-like products so prepared was then determined. TABLE II summarizes the results.

TABLE II

Viscosity of Oil/Water Oil/Vinegar Emulsions of Autolysed Yeast Products

| Washed Residue of Baker's Yeast Autolysate 5305-9411 % (g./100 ml.) | Vegetable Oil (Corn) % (ml./100 ml.) | Water % (ml./100 ml.) | Vinegar % (ml./100 ml.) | Viscosity (centipoise) |
|---|---|---|---|---|
| — | 100% | — | — | 1,500 |
| — | — | 100% | — | 1 |
| — | — | — | 100% | 1 |
| 15% | 42% | 58% | — | 53,000 |
| 15% | 46% | 54% | — | 320,000 |
| 15% | 54% | 46% | — | 315,000 |
| 15% | 58% | 42% | — | Non-Homogeneous |
| 10% | 100% | — | — | 1,900 |
| 5% | 50% | 50% | — | 1,000 |
| 10% | 50% | 50% | — | 8,650 |
| 15% | 50% | 50% | — | 560,000 |
| 20% | 50% | 50% | — | Non-Homogeneous |
| 15% | 50% | — | 50% | 1,540,000 |
| Spray-Dried Baker's Yeast | | | | |
| 15% | 50% | 50% | — | Non-Homogeneous |

These results illustrate the effect of the autolysis cell residue in increasing the viscosity of the emulsions when the proper ratios of ingredients are used. This is contrasted with spray-dried baker's yeast, which had no such effect when used at the optimum ratios.

In order to test the stability of the emulsions, two selected compositions were mixed in a kitchen mixer and then homogenized with a hand operated salad dressing homogenizer. The viscosity of the emulsion-like products was determined after homogenization, after pasteurization at 65° C. for 60 minutes, and after autoclaving at 120° C. for 15 minutes. TABLE III summarizes the results.

TABLE III

Viscosity of Oil/Water and Autolyzed Baker's Yeast Residue Emulsion Before and After Pasteurizing and Retorting

| Autolyzed Yeast Residue % (g./100 ml.) | Vegetable Oil % (ml./100 ml.) | Water % (ml./100 ml.) | | Viscosity |
|---|---|---|---|---|
| 15 | 50 | 50 | untreated | 28,400cp at 22.5° C. |
| | | | pasteurized | 21,000cp at 23° C. |
| | | | autoclaved | 96,000cp at 27° C. |
| 18.25 | 50 | 50 | untreated | 204,000 at 22.5° C. |
| | | | pasteurized | 304,000 at 34° C. |
| | | | autoclaved | Gel like not measured |

These results indicate that spreadable food products can be produced with pasteurization or autoclaving. Such products will have potential uses in diets of people who need to restrict their fat intake and are required to reduce their saturated fatty acid intake. The spreadable food products described herein can be used alone or as an ingredient in a more complex food product.

It will be apparent to those skilled in the art that many variations can be made from the foregoing examples, shown only for purposes of illustration, without departing from the scope of the invention as defined by the following claims.

We claim:

1. A spreadable food product comprising an emulsion consisting essentially of from about 10 to about 20 weight percent autolyzed yeast cell residue and from about 80 to about 90 weight percent of a combination of vegetable oil and an aqueous component wherein the volumetric ratio of the vegetable oil to the aqueous component is from about 40/60 to about 60/40.

2. The food product of claim 1 wherein the aqueous component contains from about 4 to about 8 weight percent acetic acid.

3. The food product of claim 2 wherein the amount of the autolyzed yeast residue is about 15 weight percent.

4. The food product of claim 3 wherein the volumetric ratio of the vegetable oil to the aqueous component is about 50/50.

5. The food product of claim 4 wherein the yeast is baker's yeast.

6. The food product of claim 5 wherein the vegetable oil is corn oil.

7. The food product of claim 1 wherein the aqueous component is essentially water.

8. The food product of claim 7 wherein the amount of autolyzed yeast residue is about 15 weight percent.

9. The food product of claim 8 wherein the volumetric ratio of the vegetable oil to the water is about 50/50.

10. The food product of claim 9 wherein the yeast is baker's yeast.

11. The food product of claim 10 wherein the vegetable oil is corn oil.

* * * * *